United States Patent Office 3,281,437
Patented Oct. 25, 1966

3,281,437
6-ALKYL DERIVATIVES OF TESTOSTERONE AND DIHYDROTESTOSTERONE
Howard J. Ringold and George Rosenkranz, Mexico City, Mexico, assignors, by mesne assignments, to Syntex Corporation, a corporation of Panama
No Drawing. Filed Mar. 4, 1957, Ser. No. 643,550
Claims priority, application Mexico, Mar. 5, 1956, 44,089
19 Claims. (Cl. 260—397.4)

The present invention relates to novel cyclopentanophenanthrene derivatives and to a process for the production thereof.

More particularly the present invention relates to novel androgenic hormones which are 6-alkyl derivatives of testosterone, dihydrotestosterone, 17-lower alkyl testosterone and 17-lower alkyl dihydrotestosterone. The novel useful androgens of the persent invention differ substantially in their charatceristics from the same compounds without a substituent at C–6 especially in that have a higher anabolic-androgenic ratio and myotrophic activity.

In accordance with the present invention it has been discovered that the novel compounds just described may be prepared by reacting the cycloethyleneketal of testosterone (3-ethylenedioxy-Δ5-androsten-17β-ol) J.A.C.S., 76, 1363 (1954) or the 17α-alkyl derivatives thereof with an aromatic peracid to form the corresponding 5α, 6α-oxido derivatives. These last mentioned derivatives are then treated with an alkyl magnesium bromide to form the corresponding 5α-hydroxy 6β-alkyl compounds, as for example 3-ethylenedioxy-6β-alkyl-androstan-5α, 17β-diol. The ketal group is then hydrolyzed in a slightly acid medium and the resultant compound dehydrated to form the corresponding 6β-alkyl derivatives. These derivatives on treatment with a base rearranged to the corresponding 6α-alkyl-testosterone derivatives. Finally hydrogenation in the presence of a catalyst gave the corresponding 6α-alkyl-androstan-17β-ol-3-one derivatives and the corresponding 6β-alkyl-androstan--17β-ol-3-one derivatives.

The novel compounds of the present invention may therefore be exemplified by the following formulas:

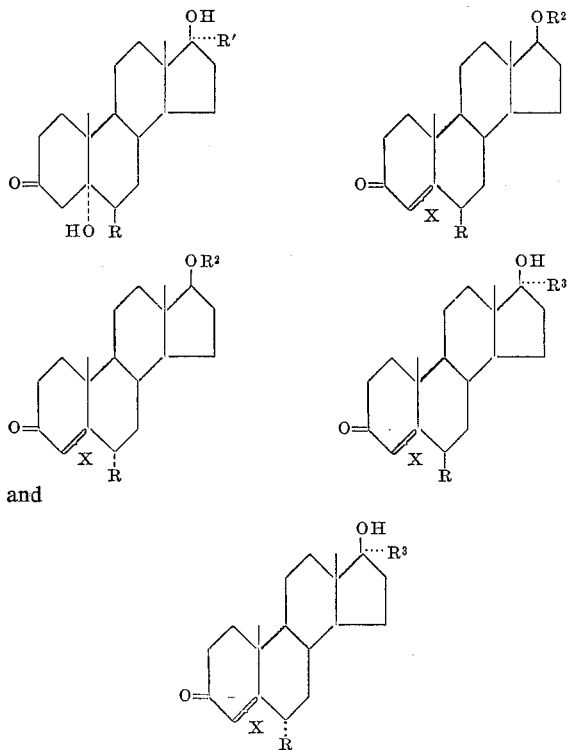

and

In the above formulas R represents an alkyl group, preferably a lower alkyl group of less than 7 carbon atoms, such as methyl or ethyl. R' represents hydrogen or a lower alkyl group of less than 7 carbon atoms such as methyl, ethyl or propyl. $R^2$ represents hydrogen or an acyl group of the type conventionally found in esterified steroid alcohols; these are generally those derived from hydrocarbon carboxylic acids of 2 to 12 carbon atoms such as acetic, propionic, butyric cyclopentylpropionic, benzoic etc. $R^3$ represents a lower alkyl group of less than 7 carbon atoms such as methyl, ethyl or propyl. X represents a double bond between C–4 and C–5 and a saturated linkage between C–4 and C–5.

The novel compounds of the present invention may be prepared by a process exemplified in part by the following equation:

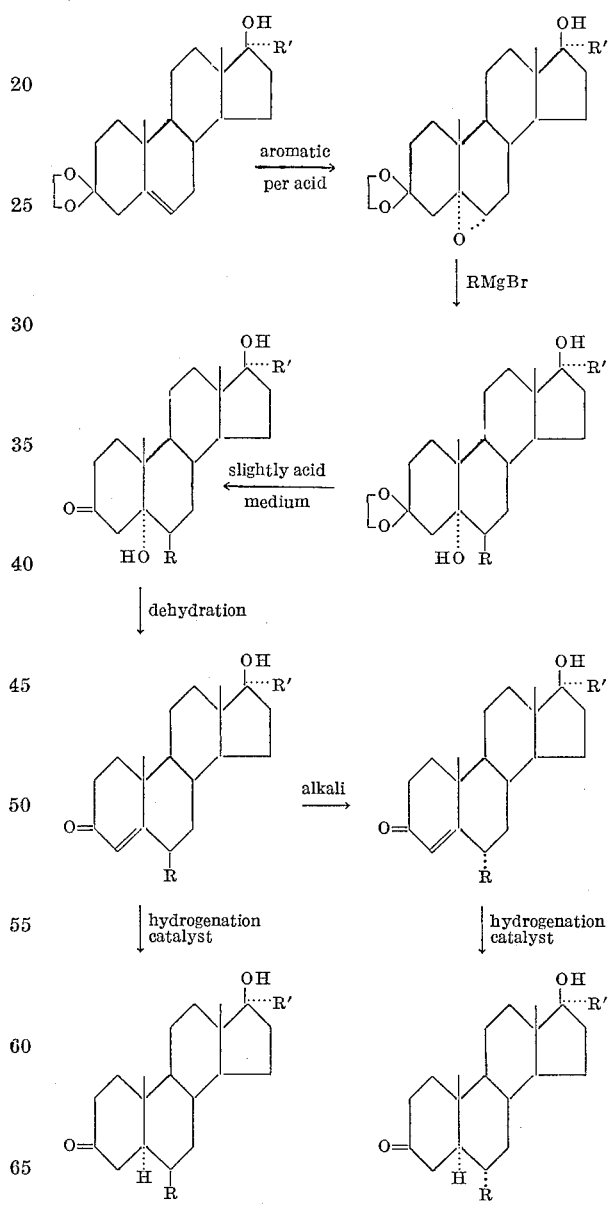

In the above equation R and R' represent the same groups as heretofore.

In practicing the process above outlined, the cycloethyleneketal of testoterone or the cycloethyleneketal of 17α-alkyl testosterone in an organic solvent solution (chloroform for example) is heated with an aromatic per acid such as perbenzoic acid. Preferably slightly over one mol of perbenzoic is used and the reaction mixture is kept standing at room temperature until slightly less than one mol is consumed. The solution is then evaporated to dryness and the product, namely the 3-ethylenedioxy-5α,6α-oxido derivative of androstan-17β-ol or 17α-lower alkyl androstan-17β-ol is separated by chromatography.

The oxido compounds of the last mentioned step are then dissolved in an organic solvent such as anhydrous benzene and treated with a lower alkyl magnesium bromide in ether. The reaction mixture was refluxed for a substantial period of time and upon separation and purification the resultant product was the corresponding 3-ethylenedioxy-6β-lower alkyl-androstan-5α,17β-diol or the 17α-lower alkyl derivative thereof. For the next step these compounds were treated with a slightly acid medium such as oxalic acid in aqueous acetone for a short period at below room temperature. The resultant hydrolysis of the cycloethyleneketal group thereupon gives the corresponding 3-keto compounds, i.e. 6β-lower alkyl-androstan-5α,17β-diol-3-one compounds and 17α-lower alkyl derivatives thereof.

The last mentioned compounds and their 17α-lower alkyl derivatives are then treated with a dehydrating agent such as thionyl chloride in pyridine at a low temperature to give the corresponding 6β-lower alkyl-Δ⁴-androsten-17β-ol-3-one compounds and the 17α-lower alkyl derivatives thereof. These 6β-lower alkyl compounds can, as indicated in the equation, be transformed to the corresponding 6α-lower alkyl compounds by treatment with a base, as for example alcoholic sodium hydroxide preferably with heating to about 50° C. As indicated, the last steps of the process involve the treatment of either the 6α or the 6β-lower alkyl-Δ⁴-3-keto compounds with hydrogen in the presence of a hydrogenation catalyst. Preferably this catalyst is a palladium catalyst such as palladium on barium sulfate catalyst.

The 6α and 6β-lower alkyl-Δ⁴-androsten-17β-ol-3-one compounds of the present invention and the corresponding saturated 6α and 6β-lower alkyl-androstan-17β-ol-3-one derivatives on conventional esterification as with acyl anhydrides gave the corresponding 17-esters of the type previously set forth.

The following specific examples serve to illustrate but are not intended to limit the present invention.

*Example I*

10 g. of the cycloethyleneketal of testosterone was treated with 1.1 mols of perbenzoic acid in chloroform solution. The mixture was kept standing at room temperature for several hours until titration showed that 0.9 mol of the peracid had been consumed. The solution was washed with dilute sodium hydroxide and water and evaporated to dryness. Chromatography in a column with 600 g. of neutral activated alumina afforded 7.0 g. of the 3-ethylenedioxy-5α,6α-oxido-androstan-17β-ol.

5 g. of this compound was dissolved in 200 cc. of thiophene free anyhdrous benzene and treated with 25 cc. of a solution of methyl magnesium bromide in ether. The mixture was refluxed for 6 hours, cooled and poured into water containing ammonium chloride. The benzene layer was separated, the aqueous phase was extracted with ethyl acetate and the combined benzene and ethyl acetate solution was evaporated to dryness. Chromatography in a column with 250 g. of neutral alumina yielded 3-ethylenedioxy-6β-methylandrostan-5α,17β-diol.

A solution of 3 g. of this compound in 60 cc. of acetone was mixed with 10 cc. of water and 300 mg. of oxalic acid and stirred for 2 hours at 15° C. The mixture was poured into 300 cc. of ice water and filtered and the residue was dried. There was obtained 6β-methyl-androstane-5α,17β-diol-3-one.

A solution of 2 g. of this compound in 15 cc. of pyridine was cooled to 0° C., mixed with 1 cc. of thionyl chloride and kept for 15 minutes at 0° C. After pouring into water, the product was extracted with ether, washed to neutral, dried over sodium sulfate and evaporated to dryness. The residue crystallized from acetone-hexane to yield 6β-methyl-testosterone.

0.5 g. of 6β-methyl-testosterone was dissolved in 10 cc. of methanol containing 0.1 g. of sodium hydroxide and the solution was heated to 50° C. and then kept for 1 hour at room temperature without previous cooling. The mixture was poured into water and extracted with methylene dichloride. Evaporation of the methylene dichloride solution and crystallization of the residue from acetone-hexane produced 0.4 g. of 6α-methyl-testosterone.

*Example II*

1 g. of 6β-methyl-testosterone dissolved in 50 cc. of methanol was hydrogenated at room temperature and atmospheric pressure in the presence of 300 mg. of palladium on barium sulfate catalyst. The catalyst was filtered, the solvent was evaporated and chromatography of the residue afforded as main product 6β-methyl-dihydrotestosterone and a secondary product 6β-methyltestan-17β-ol-3-one.

*Example III*

The treatment of 1 g. of 6α-methyl-testosterone by the method described in Example II yielded 6α-methyl-dihydrotestosterone as the main product and 6α-methyl-testan-17β-ol-3-one as secondary product.

*Example IV*

A mixture of 1 g. of 6β-methyl-testosterone, 8 cc. of anhydrous pyridine and 2 cc. of acetic anhydride was heated on the steam bath for 1 hour, poured into water and kept standing for 1 hour in order to hydrolyze the excess of anhydride. The product was extracted with ethyl acetate, washed to neutral, concentrated to a small volume and crystallized by the addition of hexane, thus producing the acetate of 6β-methyl-testosterone.

By a similar method there was prepared other esters of 6β-methyl-testosterone, such as the propionate, butyrate, phenylpropionate, cyclopentylpropionate, hexanoate, enantate, caprylate and, in general, the esters having from 2 to 12 carbon atoms.

In the same way the same esters were prepared of 6α-methyl-testosterone, of 6β-methyl-dihydrotestosterone and of 6α-methyl-dihydrotestosterone.

*Example V*

Following the methods described in Examples I and II, there were obtained from the cycloethyleneketal of 17α-methyl-testosterone: 6β,17α - dimethyl-testosterone, 6α-17α - dimethyl-testosterone, 6β,17α - dimethyl-dihydrotestosterone and 6α,17α-dimethyl-dihydrotestosterone.

*Example VI*

Following the method described in Examples I and II, there were obtained from the cycloethyleneketal of 17α-ethyl-testosterone: 6β - methyl-17α-ethyl-testosterone, 6α-methyl-17α-ethyl-testosterone, 6β - methyl-17α-ethyl-dihydrotestosterone and 6α - methyl-17α-ethyl-dihydrotestosterone.

*Example VII*

Following the method described in Examples I and II, there were obtained from the cycloethyleneketal of 17α-propyl-testosterone: 6β - methyl-17α-propyl-testosterone, 6α-methyl-17α-propyl-testosterone, 6β - methyl-17α-propyl-dihydrostestosterone and 6α-methyl-17α-propyl-dihydrotestosterone.

We claim:
1. A process for the production of compounds selected from the class consisting of 6-lower alkyl-Δ⁴-androsten-17β-ol-3-one, and 17α-lower alkyl-6-lower alkyl-Δ⁴-androsten-17β-ol-3-one comprising treating with perbenzoic acid a corresponding compound selected from the class consisting of a 3-cycloethyleneketal of $\Delta^4$-androsten-17$\beta$-ol-3-one and 17$\alpha$-lower alkyl derivatives thereof to form the corresponding 5$\alpha$,6$\alpha$-epoxide, treating the epoxide with a lower alkyl magnesium bromide to form the corresponding 5-hydroxy-6$\beta$-methyl derivative, treating the last mentioned derivative with oxalic acid in acetone to hydrolize the ketal group and form the corresponding 6$\beta$-lower alkyl-androstan-5$\alpha$,17$\beta$-diol-3-one derivative, and treating the diol derivative with thionyl chloride in pyridine to form a 6$\beta$-lower alkyl compound selected from the group consisting of 6$\beta$-lower alkyl-$\Delta^4$-androsten-17$\beta$-ol-3-one and 17$\alpha$-lower alkyl-6$\beta$-lower alkyl-$\Delta^4$-androsten-17$\beta$-ol-3-one.

2. The process of claim 1 wherein the 6$\beta$-lower alkyl compounds are further treated with alcoholic sodium hydroxide to form the corresponding 6$\alpha$-lower alkyl derivatives.

3. A process for the production of a compound selected from the group consisting of 6-lower alkyl-androstan-17$\beta$-ol-3-one and 17$\alpha$-lower alkyl-6-lower alkyl-androstan-17$\beta$-ol-3-one comprising hydrogenating a corresponding $\Delta^4$-compound in the presence of a palladium catalyst.

4. A compound of the following formula:

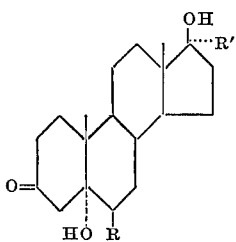

wherein R is a lower alkyl group and R' is lower alkyl containing at least two carbon atoms.

5. 6$\beta$-methyl-17$\alpha$-ethyl-androstan-5$\alpha$,17$\beta$-diol-3-one.
6. 6$\beta$-methyl-17$\alpha$-propyl-androstan-5$\alpha$,17$\beta$-diol-3-one.
7. A compound of the following formula:

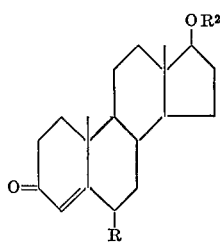

wherein R is a lower alkyl group and $R^2$ is selected from the group consisting of hydrogen and acyl of a hydrocarbon carboxylic acid of two to twelve carbon atoms.

8. 6$\beta$-methyl-$\Delta^4$-androsten-17$\beta$-ol-3-one.
9. A compound of the following formula:

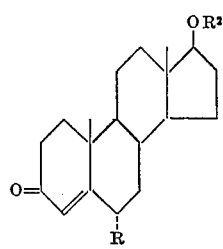

wherein R is a lower alkyl group and $R^2$ is selected from the group consisting of hydrogen and acyl of a hydrocarbon carboxylic acid of two to twelve carbon atoms.

10. 6$\alpha$-methyl-$\Delta^4$-androsten-17$\beta$-ol-3-one.
11. A compound of the following formula:

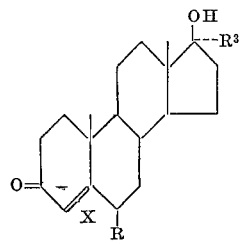

wherein R represents a lower alkyl group, $R^3$ represents a lower alkyl group containing at least two carbon atoms and X is selected from the group consisting of a double bond between C-4 and C-5 and a saturated linkage between C-4 and C-5.

12. 6$\beta$-methyl-17$\alpha$-ethyl-$\Delta^4$-androsten-17$\beta$-ol-3-one.
13. 6$\beta$-methyl-17$\alpha$-propyl-$\Delta^4$-androsten-17$\beta$-ol-3-one.
14. 6$\beta$-methyl-17$\alpha$-ethyl-androstan-17$\beta$-ol-3-one.
15. 6$\beta$-methyl-17$\alpha$-propyl-androstan-17$\beta$-ol-3-one.
16. A compound of the following formula:

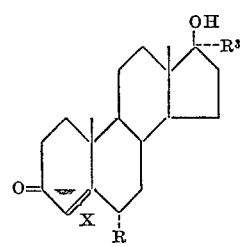

wherein R represents a lower alkyl group, $R^3$ represents a lower alkyl group containing at least two carbon atoms and X is a saturated linkage between C-4 and C-5.

17. 6$\alpha$-methyl-17$\alpha$-ethyl-androstan-17$\beta$-ol-3-one.
18. 6$\alpha$-methyl-17$\alpha$-propyl-androstan-17$\beta$-ol-3-one.

19. A process for the preparation of a 6-methyl-3-keto-$\Delta^4$-steroid of the androstane series, which comprises reacting a 3-alkylenedioxy-$\Delta^{5(6)}$-steroid of the androstane series with an organic peracid to produce the corresponding 3-alkylenedioxy-5$\alpha$,6$\alpha$-oxido steroid, reacting said 3-alkylenedioxy-5$\alpha$,6$\alpha$-oxido steroid with a methyl magnesium halide to produce the corresponding 3-alkylenedioxy-5$\alpha$-hydroxy-6$\beta$-methyl steroid, hydrolyzing said 3-alkylenedioxy-5$\alpha$-hydroxy-6$\beta$-methyl steroid to produce the corresponding 5$\alpha$-hydroxy-6$\beta$-methyl-3-keto-steroid, and dehydrating said 5$\alpha$-hydroxy-6$\beta$-methyl-3-keto steroid to produce a 6-methyl-3-keto-$\Delta^4$-steroid of the androstane series.

References Cited by the Examiner

Julia et al.: Helv. Chim. Acta, vol. 35, pp. 665–72 and 2080–9 (1952).
Romo et al.: J.A.C.S., vol. 73, pp. 4961–4 (1951).
Spero et al.: J.A.C.S. 78, Dec. 5, 1956, pp. 6213–6214.
Djerassi: J. Org. Chem., vol. 12, pp. 823–30 (1947).
Fieser et al.: Organic Chemistry, p. 64 (1956).
Madaeva et al.: Zhurnal Obshchei Khimii, vol. 10, pp. 213–6, 16 (1940).

LEWIS GOTTS, *Primary Examiner.*

JULIUS FROME, LESLIE H. GASTON, MORRIS LIEBMAN, *Examiners.*

A. G. YARTZOFF, B. G. COLLEY, R. E. WEXLER, E. L. ROBERTS, *Assistant Examiners.*